Patented May 19, 1936

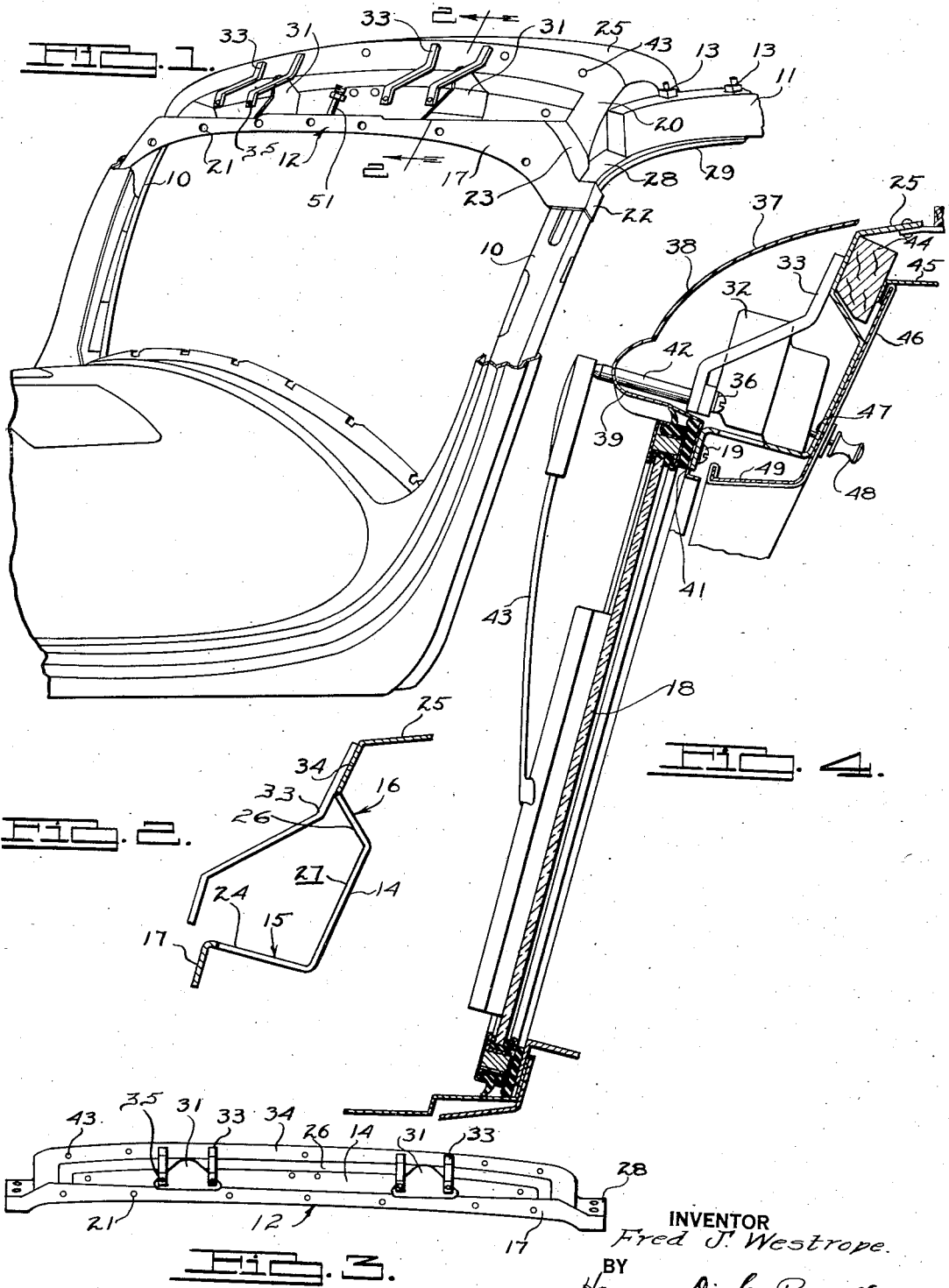

2,040,966

UNITED STATES PATENT OFFICE 2,040,966

HEADER CONSTRUCTION FOR CONCEALED WINDSHIELD WIPERS

Fred J. Westrope, Detroit, Mich., assignor to The Murray Corporation of America, a corporation of Delaware Application March 9, 1931, Serial No. 521,194

7 Claims. (Cl. 296—84)

My invention relates to vehicle bodies and particularly to a windshield header therefor which is constructed from a single sheet of metal.

Windshield headers have been constructed heretofore entirely of wood or metal or a combination thereof and have been provided with means for supporting a windshield wiper motor within the body closure or exteriorly thereof.

I propose to construct the header from a single piece of metal in such manner as to provide added strength thereto and to offset a central longitudinal portion thereof sufficiently in depth to receive the motor of a windshield wiper. The offset portion or receptacle is entirely enclosed by a top front panel which overlaps the header in such manner as to enclose the motor and the receptacle. An aperture is associated with the receptacle through which the motors are insertable within or removable from the box-like structure thus provided.

It is accordingly one object of my invention to provide a header of the above mentioned type with an indented section which shall constitute a receptacle for a motor.

Another object of my invention is to provide a header of the above mentioned type, having a channel portion formed therein, with a top front panel which shall enclose the channel portion to constitute a box-like structure.

A still further object of my invention is to provide a header of the above mentioned type, having a receptacle therein which is covered by a top front panel, with an aperture through which a windshield wiper motor may be inserted to within the receptacle.

A still further object of my invention is to provide a header of the above mentioned type which is formed from a single sheet of metal in such manner as to constitute a receptacle portion with a strengthening and a supporting portion of a configuration which is herein illustrated and described.

With these objects in mind my invention will best be understood by referring to the following description in conjunction with the accompanying drawing, wherein:

Fig. 1 is a perspective view, in angular elevation, of door pillars and a side roof rail united to a header which embodies features of my invention.

Fig. 2 is an enlarged sectional view of the header illustrated in Fig. 1 taken along the line 2—2 thereof.

Fig. 3 is a front view, in elevation, of the header shown in Fig. 1.

Fig. 4 is a view, in sectional elevation, of a windshield assembly disclosing the header illustrated in Figs. 1, 2 and 3, in which the windshield wiper motors are mounted.

My invention comprises in general, front body pillars 10, side roof rails 11 and a windshield header 12 which is supported between the pillars 10 and the side roof rails 11. The pillars 10 are of box-like channel structure made of metal upon which the header 12 is supported and rigidly welded thereto. The side roof rails 11 are made of wood and are united to the header 12 by means of bolts 13.

The windshield header 12 comprises a sheet metal member, the central section of which is illustrated in Fig. 2. A main web portion 14 is provided with an outwardly extending flanged portion 15 and an inwardly presenting channel portion 16, the purpose and method of construction of which will now be described.

A flange 17 of the angle portion 15 constitutes an outer face against which a windshield 18 is supported by means of bolts 19 which register with bolt holes 21 provided in the flange 17. The flange 17 extends over the front surface of the front body pillars 10 and is itself provided with flanges 22 which project over the outer side of the pillars.

The channel 16 extends across the top of the web 14 and projects downwardly along its sides at 20 to join the flange 17 through downwardly sloping extensions 23 provided in continuation of the web 24 of the flanged portion 15. By having the flanged member 15 and the channel member 16 so constructed about the web 14 my header is substantially strengthened across both its lateral and transverse dimensions.

The side 25 of the channel 16 extends across the top of the header between the side roof pillars 11 to thereby constitute a front roof bow. A side 26 of the channel 16 and the side 24 of the flanged member 15 form, with the web 14, a receptacle 27 extending longitudinally in the header in such manner as to be encompassed by the channel 16 which extends thereabove and along its two outer sides.

The bow portion 25 of the channel 16 extends downwardly on each of its sides and projects laterally thereof to constitute flanges 28 which join the downwardly sloping extension 23 and the flange 17. The flange 28 conforms to the shape of the extension 29 of the front body pillar 10 and is welded thereto to constitute a supporting member for the side roof rails 11.

The windshield header 12 so constructed is pressed from a single sheet of metal during a single operation. The formation is accomplished between a pair of dies (not disclosed) the configuration of which will be readily apparent to anyone skilled in pressed metal work from the shape of my header illustrated in the several views of the drawing.

Apertures 31 are provided in the web 14 of such shape and size as to permit the insertion of a windshield-wiper motor 32 to within the receptacle 27. A pair of straps 33 are attached to a web portion 34 of the channel 16, preferably by welding, and are bent away from the web 34 and downwardly to constitute brackets for the motor 32. Holes 35 are provided in the ends of the brackets and are threaded to receive bolts 36 by means of which the motor 32 is supported on the bracket. The brackets are so mounted as to have the holes 35 thereof provided within the confines of the apertures 31 as illustrated in Fig. 3 in order that the mounting or removal of the motor 32 may be accomplished through the aperture.

A front top panel 37 slopes frontwardly and downwardly from the bow 25, as at 38 in Fig. 4, and then curves and slopes backwardly as at 39 to join the flange 17 through an angle extension 41 provided thereon. In this construction the front top panel 37 covers the receptacle 27 and the motor 32 to completely enclose the motor. The motor 32 is provided with a shaft 42 which extends through the curved portion 39 of the front top panel 37 on the outer end of which a windshield wiper 43 is rigidly attached.

Holes 43 are provided in the web portion 34 of the channel 16 for the purpose of supporting a wooden member 44 by means of screws which extend through the holes. Head-lining cloth 45 is then tacked to the member 44 and a header finish panel 46 of angular shape is then attached to the member 44 to cover the tacked edge of the head-lining cloth 45, and the inner surface of the header 12.

An operating shaft 47 which controls the starting and stopping of the motor, projects through the aperture 31 and a hole in the finish panel 46 and is provided with an operating knob 48 exteriorly of the member. An inwardly directed flange 49 on the finish panel 46 forms a tubular-shaped opening with the under side of the web 24 through which a conductor 51 for supplying energy to the motor extends and is illustrated in Fig. 1 as a suction tube. It is to be understood that the conductor 51 may be a wire which is connected to a source of electric energy for operating a motor which is of the electric rather than the vacuum type.

It will thus be seen that I have provided a header for a vehicle carriage which embodies considerable strength because of its angular and channel formation which are arranged to constitute a receptacle wherein motors for operating windshield wipers are enclosed. Apertures are provided in a wall of the receptacle through which the motors may be inserted and mounted on brackets which are accessible through the opening. The receptacle and the motor are completely enclosed by a top front panel which extends downwardly and forwardly completely enclosing the header. The inner portion of the header is closed by a finished member which constitutes a tubular opening therewith through which the energy conductor for the motor extends.

While I have described but a single embodiment of my invention, it will be apparent to anyone skilled in the art that many omissions, additions, changes and substitutions may be made therein without departing from the spirit and scope of my invention as set forth in the accompanying claims.

I claim as my invention:

1. A header for a vehicle carriage constituting a unit member embodying a windshield supporting member, a front roof bow, engaging means for front body pillars and supporting flanges for side roof rails.

2. A header for a vehicle carriage constituting a unit member embodying a windshield supporting member, a front roof bow, a receptacle between said supporting member and said bow for receiving a motor, engaging means for the front body pillars and supporting flanges for the side roof rails.

3. A header for a vehicle body construction comprising a unitary sheet metal stamping formed to provide two oppositely presenting channels having a common wall, said channels being disposed longitudinally of the header and one above the other in substantially parallel relation, the lower of said channels facing outwardly from the body and providing a housing for windshield wiper operating mechanism, said lower outwardly facing channel having an opening in the rear thereof for permitting the insertion of the wiper operating mechanism from the interior of the body.

4. A vehicle body, including, in combination, rearwardly sloping door pillars, a windshield frame supported by said pillars, a header disposed above and rearwardly of said frame, and a finish panel extending over said header and adjoining said pillars and windshield frame.

5. The combination in a vehicle body, of a pair of sloping door pillars, a header extending across said door pillars and projecting rearwardly thereof, a panel extending over said header and joining said pillars, and a windshield panel having a frame thereabout which is secured to said pillars and panel, the plane of said frame being forwardly of all portions of said header.

6. A vehicle body including, in combination, rearwardly sloping door pillars, a windshield supported by said pillars, a header disposed above and rearwardly of said windshield, and a finish panel extending over said header and joining said pillars and windshield frame.

7. The combination in a vehicle body, of a pair of sloping door pillars, a header extending across said door pillars and projecting rearwardly thereof, a panel extending over said header and joining said pillars, and a windshield secured to said pillars and panel, the plane of said windshield being forwardly of said header.

FRED J. WESTROPE.